United States Patent [19]

Uehara

[11] Patent Number: 5,690,208
[45] Date of Patent: Nov. 25, 1997

[54] CLUTCH DISK VIBRATION DAMPER ASSEMBLY

[75] Inventor: Hiroshi Uehara, Hirakata, Japan

[73] Assignee: Exedy Corporation, Osaka, Japan

[21] Appl. No.: 777,869

[22] Filed: Dec. 31, 1996

Related U.S. Application Data

[63] Continuation of Ser. No. 530,776, Sep. 19, 1995, abandoned.

[30] Foreign Application Priority Data

Sep. 29, 1994 [JP] Japan ..................... 6-234962
Sep. 29, 1994 [JP] Japan ..................... 6-234963

[51] Int. Cl.⁶ ................. F16D 13/64; F16D 3/14; F16D 3/66
[52] U.S. Cl. ............. 192/214.1; 192/207; 192/212; 464/68
[58] Field of Search ............ 192/70.17, 200, 192/207, 212, 213, 213.1, 213.11, 213.12, 213.2, 213.21, 213.22, 213.3, 213.31, 214, 214.1; 464/68

[56] References Cited

U.S. PATENT DOCUMENTS

| | | | |
|---|---|---|---|
| 1,952,892 | 3/1934 | Reed | 192/213.2 |
| 4,190,142 | 2/1980 | Berlioux | 192/214.1 |
| 4,352,420 | 10/1982 | Maycock | 192/214.1 |
| 4,440,283 | 4/1984 | Nioloux | 192/213.22 |
| 4,496,036 | 1/1985 | Loizeau | 192/213.31 |
| 4,577,742 | 3/1986 | Saida | 192/213.22 |
| 4,588,062 | 5/1986 | Caray et al. | 192/214.1 |
| 4,643,288 | 2/1987 | Tomm et al. | 192/213.22 |
| 5,505,288 | 4/1996 | Tomiyama et al. | 192/213.31 |

FOREIGN PATENT DOCUMENTS

| | | |
|---|---|---|
| 2738221 A1 | 4/1978 | Germany. |
| 3314908 A1 | 11/1983 | Germany. |
| 3324999 C2 | 1/1984 | Germany. |
| 3415927 A1 | 10/1985 | Germany. |

*Primary Examiner*—Richard M. Lorence
*Attorney, Agent, or Firm*—Shinjyu Office of Patent Attorney

[57] ABSTRACT

A clutch disc assembly 1 includes a first disc member 2, second disc members 3, coil springs 11, a first coupling mechanism 4, a second coupling member 7 and a spline hub 6. The second disc members 3 are placed on sides of the first disc member 2, and they are provided in inner circumferential portions with spline teeth 3a laterally protruding. Coil springs 11 are disposed between the first disc member 2 and the second disc members 3 in circumferential directions so as to be elastically deformed. The spline hub 6 is provided in its outer circumference with outside spline teeth 6a which mesh with the spline teeth 3a. The second coupling member 7 includes a third friction washer 21 and a spring 20. The third friction washer 21 frictionally slides on one of the spline hub 6 and the second disc members 3. The spring 20 is placed between the spline hub 6 and the second disc members 3 so as to be elastically deformed and urges the third friction washer 21 against the adjacent second disc member 3.

29 Claims, 4 Drawing Sheets

CLUTCH DISK VIBRATION DAMPER ASSEMBLY

This application is a file wrapper continuation of application Ser. No. 08/530,776, filed Sep. 19, 1995 (abandoned).

BACKGROUND OF THE INVENTION

A) Field of the Invention

The present invention relates to a clutch disc assembly having a vibration dampening device that includes a plurality of spring members and a plurality of disc members with the spring members disposed within openings of one of the disc members, and friction producing elements which further dampen vibration.

B) Description of the Related Art

Clutch discs in recent years have been manufactured with vibration dampening devices. One such clutch disc includes a damper disc assembly which includes a first disc element to which torque is applied, second disc elements placed on sides of the first disc element, coil springs disposed in circular directions between the first and second disc elements so as to be elastically deformed, and a spline hub fixed in inner circumferential portions of the second disc elements.

In the clutch disc assembly, the second disc elements and the spline hub are riveted to each other. Torque from the second disc elements is transmitted to the spline hub through the rivets. Therefore, the forces on the rivets and the second disc elements in the vicinity of the rivets is great. Eventually, the forces acting on the rivets and the second disc elements can cause premature wear and damage.

The clutch disc assembly may also include a first coupling mechanism for coupling the first disc element and the second disc elements, and a second coupling mechanism for coupling the second disc elements and the hub. The first coupling mechanism includes elastic elements (coil springs) disposed in circumferential directions between those components so as to be elastically deformed. The second coupling mechanism includes a frictional resistance generating mechanism for generating frictional resistance between the components when they relatively rotate.

The frictional resistance generating mechanism typically includes a friction washer and an urging element (cone spring) for urging the friction washer to one of those components. With above-mentioned configuration, various torsional properties are provided corresponding to the angle displacement between relatively rotatable parts, to dampen some of the torsional vibration.

In the above described clutch disc assembly, the second coupling element is placed in a relatively narrow space between an inner circumferential portion of the second disc elements and the hub. Hence, the number of the components is increased, complicating the assembly process, and the manufacturing costs are generally high.

SUMMARY OF THE INVENTION

Accordingly, it is one object of the present invention to reduce the possibility of damage to clutch disc components which are connected to the clutch disc hub.

Accordingly, it is another object of the present invention to attempt to simplify the configuration coupling disc elements on the hub in a clutch disc assembly.

In accordance with the present invention, a clutch disc assembly includes a first disc member formed with a plurality of circumferencially spaced apart windows. A pair of second disc members are disposed on opposite sides of the first disc member. The second disc members are formed with first spline teeth laterally extending from an inner circumferential portion thereof. The clutch disc assembly further includes a plurality of first elastic members, each one of the first elastic members disposed within one of the windows and disposed between the second disc members. Each of the first elastic member is elastically deformable in response to relative rotary displacement between the first disc member and the second disc members. A hub formed with second spline teeth on its outer circumference is disposed centrally within the first and second disc member, the second spline teeth engaging the first spline teeth.

Preferably, the first spline teeth are formed by deformation of the second disc members.

Preferably, a predetermined clearance is formed in circular directions between the first spline teeth and the second spline teeth such that there is limited relative rotary displacement therebetween.

Preferably, the clutch assembly includes a second elastic member that is elastically deformable in circumferential directions between the second disc members and the hub, and a first frictional resistance generating mechanism which generates frictional resistance between the second disc members and the hub in response to relative rotary displacement between the second disc members and the hub.

Preferably, the clutch disc assembly also includes a second frictional resistance generating mechanism for generating frictional resistance between the first disc member and the second disc members in response to relative rotary displacement of the first disc member and the second disc members, the second frictional resistance generating mechanism including a friction plate which meshes with the first spline teeth so as to rotate therewith and the second frictional resistance generating mechanism contacts the second disc members, and an urging member which meshes with the first spline teeth for rotation therewith, the urging member urging the friction plate toward the second disc members.

Preferably, the second elastic member is formed of a single plate-like member having a plurality of arcuate shaped slits formed therein.

In another aspect of the invention, the clutch disc assembly further includes:

a frictional resistance generating mechanism generating frictional resistance between the first disc member and the second disc member in response to relative rotary displacement between the first disc member and the second disc member, and a second elastic member disposed between a portion of the hub and the second disc members, the second elastic member being deformable in response to relative rotary displacement between the hub and the second disc members, deformation of the second elastic member urging the frictional resistance generating mechanism to generate frictional resistance.

Preferably, a plurality of slits extending in circular directions are formed in the second elastic member.

Preferably, the frictional resistance generating mechanism includes a first friction plate disposed between first disc member and one of the second disc members, the first friction plate engaging the one of the second disc members to rotate therewith.

Still more preferably, the frictional resistance generating mechanism further includes a cone spring disposed between the first friction plate and the one of the second disc members for limited rotary displacement with respect to the one of the second disc members.

Preferably, the frictional resistance generating mechanism further includes a second friction plate disposed between first disc member and a second of the second disc members, the second friction plate configured for engagement with the second of the second disc members for rotation therewith.

Preferably, the frictional resistance generating mechanism further includes a third friction plate disposed between the second of the second disc members and a portion of the hub, the third friction plate engaging the hub to rotate therewith.

In another aspect of the invention, the frictional resistance generating mechanism includes a friction plate disposed between the hub and one of the second disc members, the friction plate engaging the hub to rotate therewith.

Preferably, the second elastic member is connected to both the hub and one of the second disc members allowing limited rotary displacement between the hub and the one of the second disc members.

Preferably, the second elastic member and the hub are configured to urge the second disc members toward one another with the first disc member confined therebetween.

Preferably, a plurality of pins extend between the second disc members, one of each of the pins extending through a corresponding one of the windows, the pins confining the second disc members to rotate with one another.

In the clutch disc assembly according to the present invention, torque, when applied to the first disc element, is transmitted to the second disc elements through the first elastic element and then output to the hub. In this situation, since the second disc elements are provided in the inner circumferential portions with the first spline teeth which laterally protrude, a contact area of the second disc elements with the hub is increased, and damage to the second disc elements are avoided.

In case where the first spline teeth are formed by stamping, processing them is facilitated.

In case where there are specified clearances in circular directions between the first spline teeth and the second spline teeth, the second disc elements and the hub can relatively rotate.

In case where the clutch disc assembly further includes the second elastic element and the first frictional resistance generating mechanism, the second elastic element is elastically deformed in circular directions while the first frictional resistance generating mechanism generates frictional resistance when the second disc elements and the hub relatively rotate. As a result, torsional vibration is effectively dampened.

In case where the clutch disc assembly further includes the second frictional resistance generating mechanism and both the friction plate and the urging element mesh with outer circumferences of the first spline teeth, the urging element and the friction plate rotate stably in tee second frictional resistance generating mechanism, and a stable property of generating frictional resistance is attained. In this case, the first spline teeth are elements engaging the second disc elements with the hub and functions as parts engaging with the components of the second frictional resistance generating mechanism. Hence, there is no need of particularly providing parts engaging with the second frictional resistance generating mechanism, and the second disc elements are simplified in configuration.

In the clutch disc assembly according to the present invention, torque, when applied to the first disc element, is transmitted to the second disc elements through the first coupling mechanism and further output to the hub through the second coupling mechanism. When torsional vibration is input and the first disc element and the second disc elements relatively rotate, the first elastic element expand and contract in a circumferential direction repetitively, and simultaneously the frictional resistance generating mechanism generates a specified level of friction resistance to dampen the torsional vibration. Moreover, the second disc elements and the hub relatively rotate, the second elastic element expands and contracts in circumferential directions between the hub and the second disc elements, and the friction plate frictional slides on one of the hub and the second disc elements to generate a specified level of friction resistance. In this way, the torsional vibration is effectively dampened. In this situation, since the second elastic element in the second coupling mechanism functions as an urging element for urging the friction plate as well as an elastic element between the hub and the second disc elements, the number of the components can be reduced compared with the prior art embodiment, and the configuration is simplified.

In case where the second elastic element is made of a single plate where slits are formed, the configuration is also simplified.

In case where a plurality of slits extending in circular directions are formed in the second elastic element, elastic deformation in circumferential directions is facilitated, and urging force in axial directions are sufficiently ensured.

In case where the friction plate engages with one of the hub and the second disc elements so as not to rotate, the friction plate frictionally slides on one of those components while rotating along with the other of the components in unity, and therefore, the frictional resistance is stably generated.

In case where the second elastic element engages with the other of the hub and the second disc elements so as not to rotate, the second elastic element rotates along with the friction plate in unity, and therefore, the friction plate is not easily damaged.

In case where an inner circumferential portion of the friction plate engages with an outer circumferential portion of the hub, the friction plate frictionally slides on the second disc elements while rotating along with the hub in unity. In this case, since the friction plate rotates along with the hub in unity, the frictional resistance is stably generated.

In case where the second elastic element and the friction plate are disposed on opposite sides of the second disc elements, assembling and disassembling of them are facilitated.

In case where the second elastic element has the first engagement portion engaging with the supporting portions so as not to relatively rotate and the second engagement portion engaging with the spline teeth of the hub so as not to relatively rotate, the second elastic element adapts its shape to other components for engagement, and there is no need of providing any particular engagement portion.

In case where the first engagement portion urges the second disc elements to one of the components while the second engagement portion urges the hub to the other, the hub and the friction plate push against each other in axial directions. In this case, there is no need of providing the hub and the friction plate close to each other.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

Figure 1:
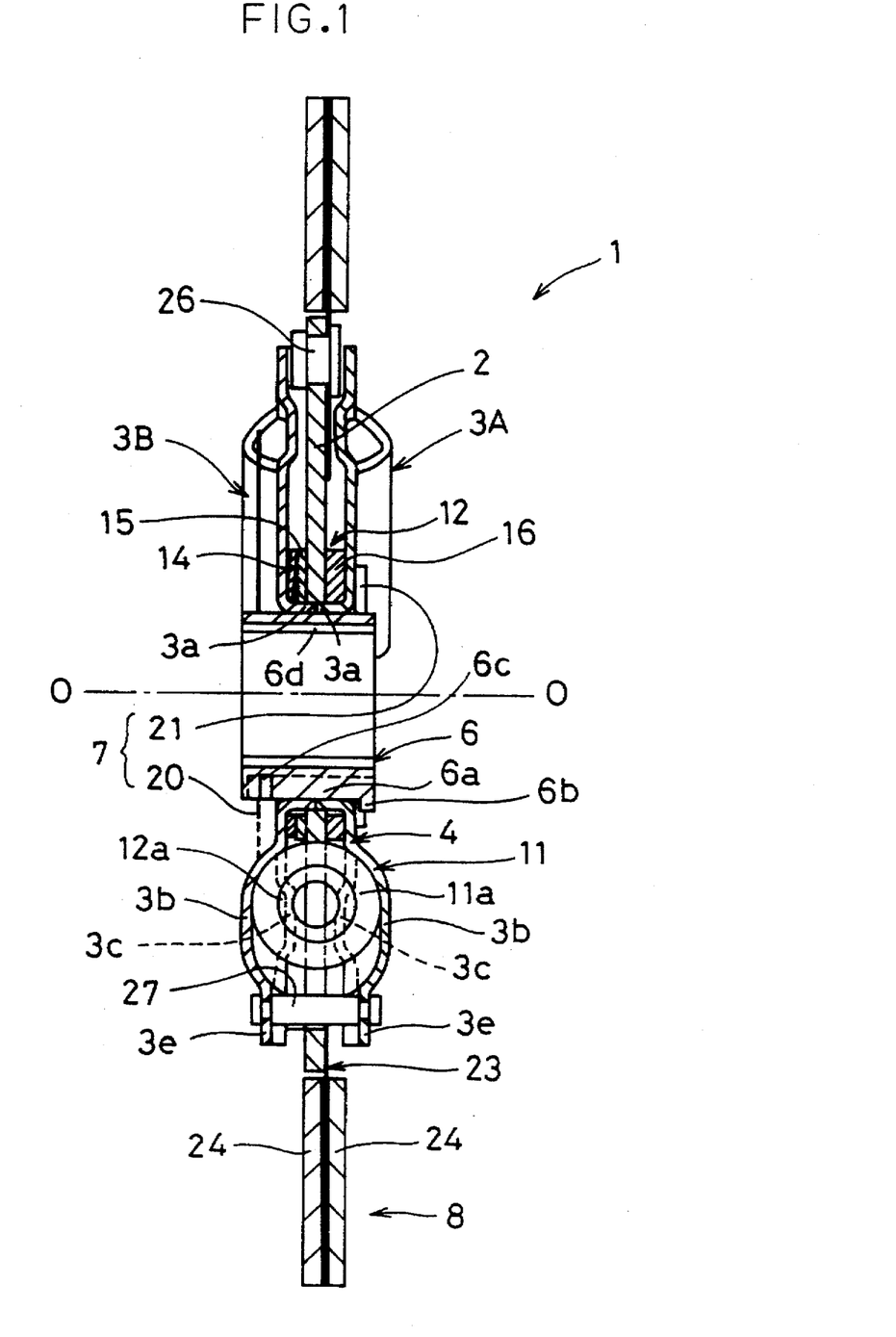
FIG. 1 is a side section of a clutch disc assembly in accordance with one embodiment of the present invention.
Figure 2:
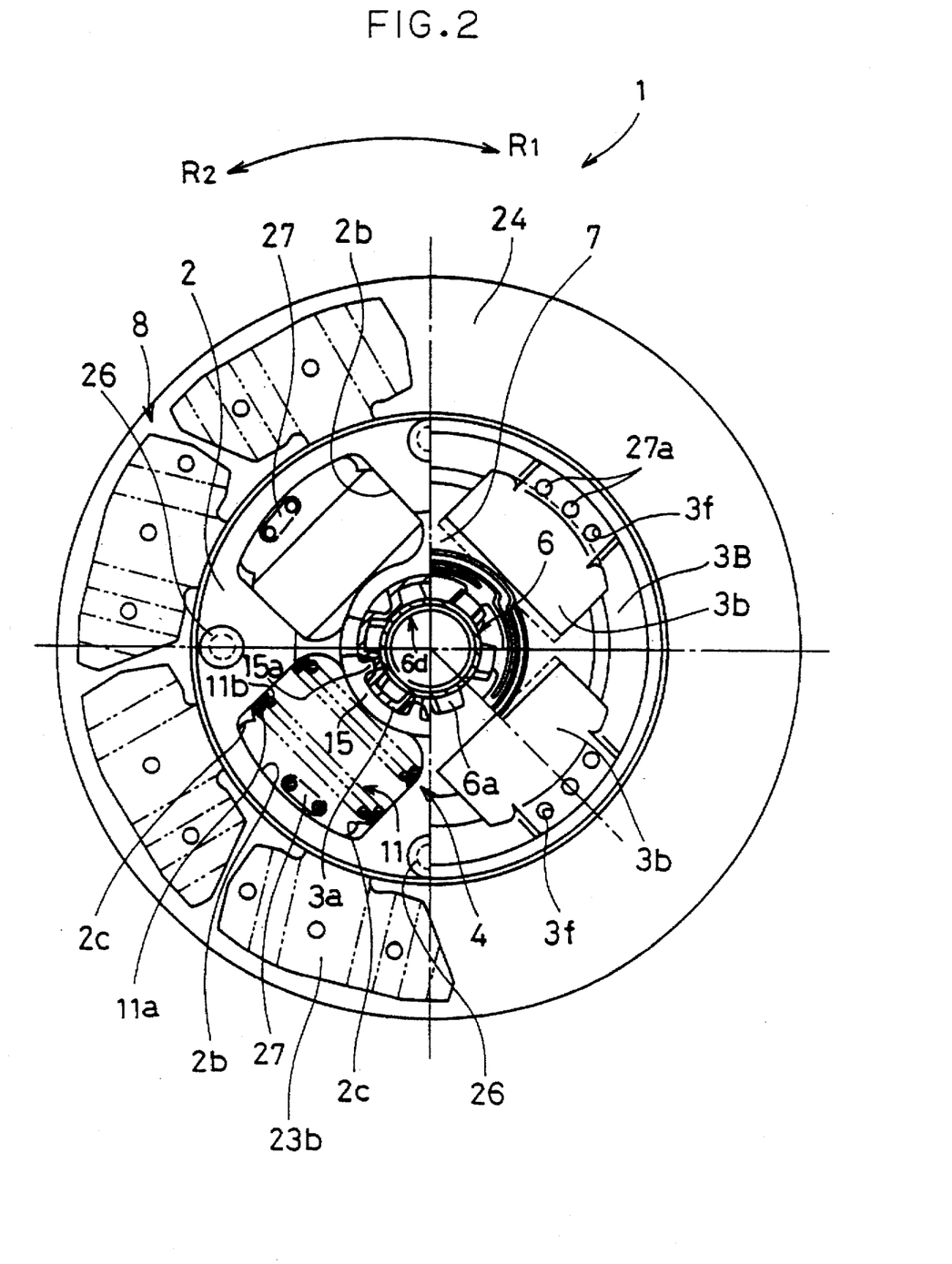
FIG. 2 is a part elevation, part section of the clutch disc assembly depicted in FIG. 1.

FIG. 1 and FIG. 2 respectively depict a clutch disc assembly 1 in accordance with one embodiment of the present invention. The line O—O in FIG. 1 denotes an axis of rotation while a direction R1 in FIG. 2, represents a direction of rotation of an engine (not shown) that would typically be connectable to the clutch disc assembly for providing torque.

The clutch disc assembly 1 includes a first disc element 2, a pair of second disc elements 3A and 3B, a first coupling element 4. The first coupling element 4 couples the first disc element 2 and the second disc elements 3A and 3B in circumferential directions. The clutch disc assembly 1 also includes a central spline hub 6, a second coupling element 7 for coupling the second disc elements 3 and the spline hub 6 in circumferential directions, and a torque input element 8 fixed to an outer circumferential portion of the first disc element 2.

Torque is transmitted from an engine (not shown) to a transmission (not shown) through the clutch disc assembly 1 as follows. The torque input element 8 engages a friction surface of, for instance, a flywheel (not shown) connected to the engine (not shown), torque is transmitted through the torque input element 8 to the first disc element 2, then to the first coupling element 4, to the second disc elements 3A and 3B, the second coupling element 7 and then the spline hub 6.

Figure 4:
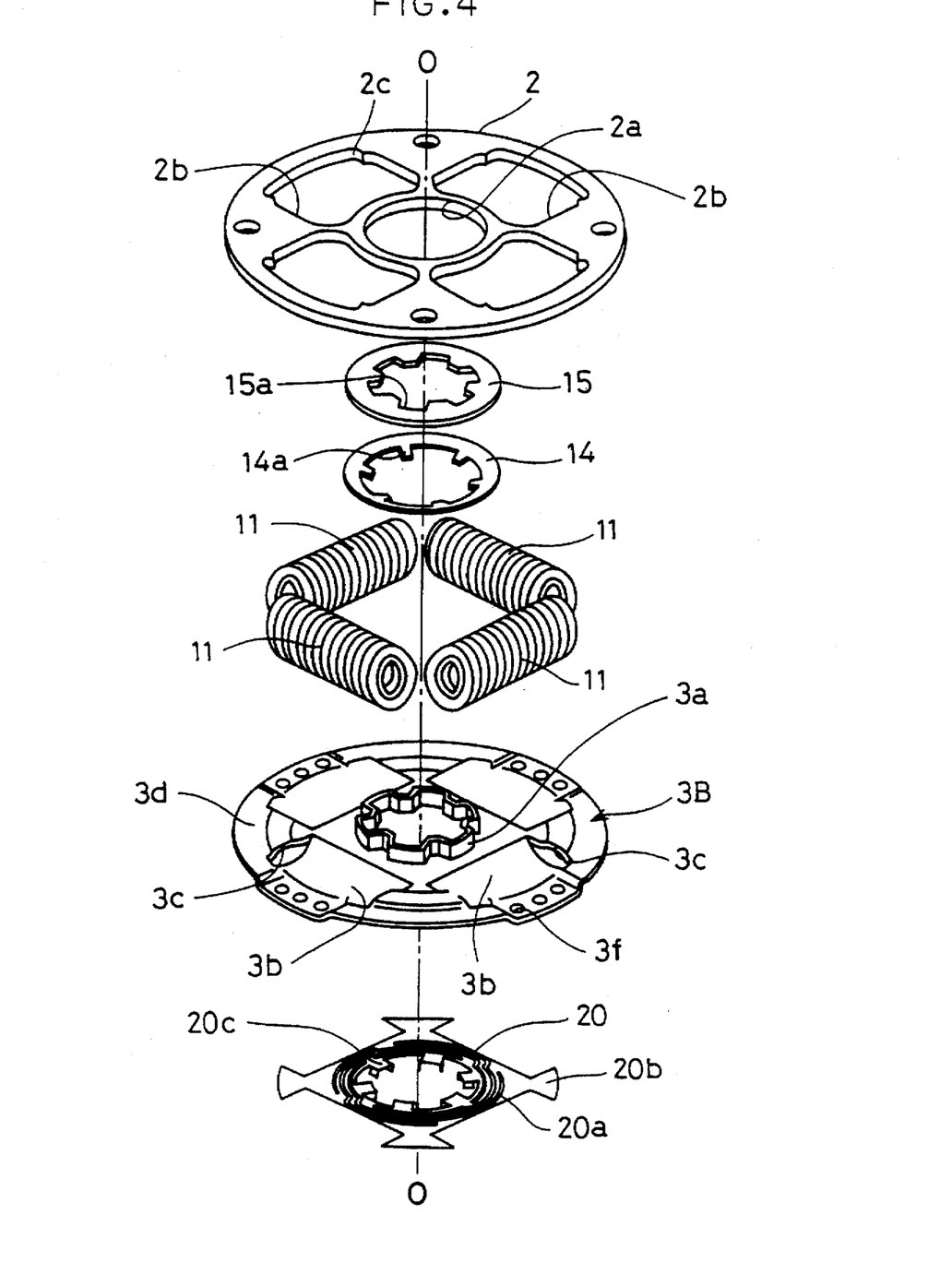
FIG. 4 is an exploded perspective view of another portion of the clutch disc assembly depicted in FIGS. 1, 2 and 3.

The first disc element 2 has a disc shape, as shown in FIG. 4, and is formed with a hole 2a at its center. Four window holes 2b are also formed in the first disc element 2 surrounding the center hole 2a. The window holes 2b have a generally arcuate shape but are elongated in a semi-rectangular shape in a circumferential direction about the center of the first disc element 2. Contact portions 2c are formed in an outer circumference of each of the window holes 2b. The inner circumferential corners of adjacent the window holes 2b lie close to each other, so that the distance between adjacent the window holes 2b is minimized.

Figure 3:
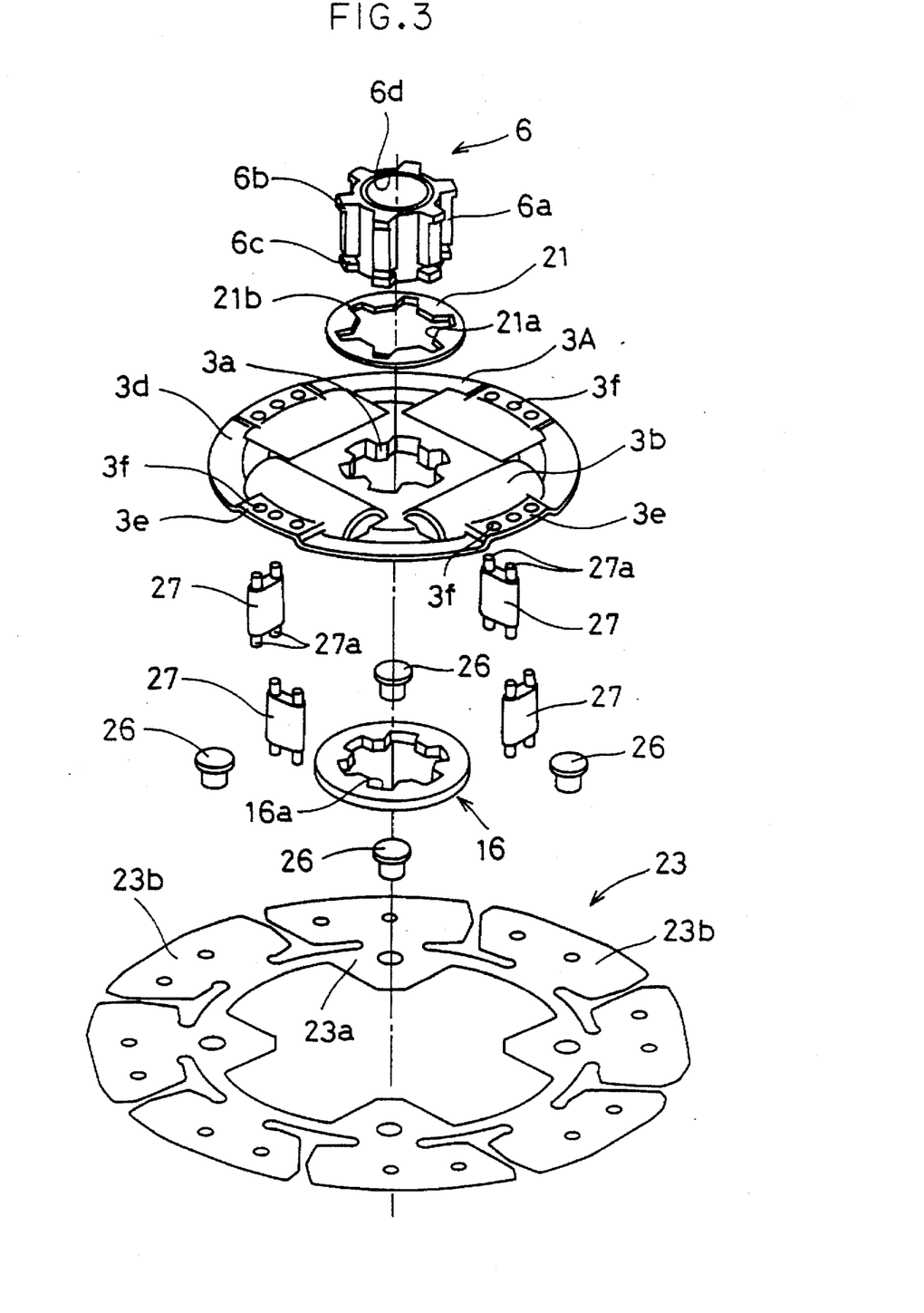
FIG. 3 is an exploded perspective view of a portion of the clutch disc assembly depicted FIGS. 1 and 2.

The torque input element 8 is fixed to an outer circumferential portion of the first disc element 2 between adjacent ones of the window holes 2b by rivets 26. The torque input element 8 includes a cushioning plate 23 and two friction facings 24. The cushioning plate 23 is, as shown in FIG. 3, an annular, generally ring shaped plate, having an annular coupling element 23a and a plurality of cushioning elements 23b disposed along an outer circumference of the coupling element 23a. Friction facings 24 are fixed to opposite surfaces of the cushioning elements 23b.

The second disc elements 3A and 3B are formed with generally the same shape. The second disc elements 3A and 3B are disposed on opposite sides of the first disc element 2. The second disc elements 3A and 3B are fixed to each other by four stopper pins 27 (described below). In an inner circumferential portions of the second disc elements 3A and 3B, spline teeth 3a are formed extending in axial directions. The spline teeth 3a of the second disc element 3A (see FIG. 4) and those of the second disc element 3B extend close to each other to be adjacent and in line with each other. The second disc elements 3A and 3B are respectively provided with supporting portions 3b corresponding in positions to the window holes 2b of the first disc element 2. The supporting portions 3b protrude axially and are semi-cylindrical in shape and which are pressed outward in axial directions so as to be spaced apart from the first disc element 2. Opposite ends of the supporting portions 3b in circumferential directions are sheared away from the main portion of the second disc elements 3A and 3B to form cut-away surfaces 3c (shown in FIGS. 1 and 4). The distance between adjacent ones of the cut-away surfaces 3c is generally small in the embodiment depicted.

As shown in FIGS. 3 and 4, by means of drawing press, step portions 3e are continuously formed in an outer circumferential flat portion 3d and outside the supporting portions 3b of the second disc elements 3A and 3B. The step portions 3e are raised outward in axial directions from the outer circumferential flat portion 3d or in a direction slightly spaced apart from the first disc element 2. The step portions 3e are flat and are respectively provided with three holes 3f side by side in circumferential directions.

The stopper pins 27 are elements narrow but elongated in circumferential directions, as will be recognized in FIG. 2 and FIG. 3, and respectively have two legs 27a at their opposite ends in axial directions. The legs 27a are inserted and caulked in two of the holes 3f of the second disc elements 3A and 3B on a side designated as R2 in FIG. 2. Stalks of the stopper pins 27 extend through the window holes 2b between the contact portions 2c, adjacent to the outer circumferential portions of coil springs 11 in the second disc elements 3A and 3B. When the stopper pins 27 come in contact with the contact portions 2c in the window holes 2b, the first disc element 2 and the pair of the second disc elements 3 stop relative rotation. The stopper pins 27 are displaced slightly toward the side designated as R2 in conjunction with the second disc elements 3, and an torsional angle becomes larger on a side designated as R1. In other words, in a torsion free state, the stopper pins 27 are slightly off center toward the side designated as R2 within the contact portions 2c in the window holes 2b.

The first coupling portion 4 includes four coil springs 11 and a first frictional resistance generating mechanism 12.

The coil springs 11 respectively consists of a large coil spring 11a and a small coil spring 11b placed inside the large coil spring 11a. The coil springs 11 are disposed in spaces formed by the window holes 2b in the first disc element 2 and the supporting portions 3b in the pair of the second disc elements 3. Opposite ends of the coil springs 11 in circumferential directions come in contact with end surfaces of the window holes 2b and the cut-away surfaces 3c of the second disc elements 3. The coil springs 11 are restricted in movement outward in both axial and radial directions by the supporting portions 3b of the second disc elements 3.

The first frictional resistance generating mechanism 12 is a device for generating frictional resistance when the first disc element 2 and the second disc elements 3 relatively rotate, and it is placed between inner circumferential portions of the first disc element 2 and the second disc elements 3. The first frictional resistance generating mechanism 12 includes a cone spring 14, a first friction washer 15, and a second friction washer 16. The cone spring 14 and the first friction washer 15 are disposed in order from a side of the first plate 3B between inner circumferential portions of the first plate 3B and the first disc element 2. The cone spring 14 has a plurality of projections 14a extending inward, as can be seen in FIG. 4.

The first friction washer 15 is provided with spline grooves 15a in its inner circumferential portion. The projections 14a and the spline grooves 15a mesh with the spline teeth 3a on their outer circumferential side in the second plate 3B so as not to relatively rotate. A second friction washer 16 is placed between inner circumferential portions of the first plate 3A and the first disc element 2. The second friction washer 16 is, as can be seen in FIG. 3, provided with spline grooves 16a at its inner circumferential portion, and the spline grooves 16a mesh with the spline teeth 3a at their outer circumferential portion in the first plate 3A. The cone spring 14 compressed in the above-mentioned configuration urges the second disc elements 3 to the left in FIG. 1 and the first friction washer 15 to the right in FIG. 1. As a result, the first friction washer 15 and the second friction washer 16 are in press contact with an inner circumferential side surface of the first disc element 2.

The spline hub 6 is placed close to the inner circumferential portions of the first disc element 2 and the second disc elements 3. In an outer circumference of the spline hub 6, outside spline teeth 6a are formed. The outside spline teeth 6a mesh with the spline teeth 3a in the second disc elements 3 at specified intervals in circumferential directions. The outside spline teeth 6a are provided at their respective ends on a right side in FIG. 1 with engagement projections 6b protruding in radial directions. The outside spline teeth 6a are also provided with notches 6c in positions on a left side in FIG. 1. In an inner circumferential portion of the spline hub 6, inside spline teeth 6d which mesh with a power input shaft (not shown) of the transmission are formed.

The second coupling element 7 includes a single spring 20 and a third friction washer 21. The spring 20 is, as shown in FIG. 1, placed on a side of the second plate 3B. As can be seen in FIG. 4, the spring 20 is of a single thin plate. The spring 20 is roughly shaped in a rectangle having a circular hole at its center. In the spring 20, a plurality of slits 20a extending in circumferential directions are formed. The slits 20a are formed so as to make arcuately layered spaced apart portions in radial directions. The slits 20a permit the spring 20 to be elastically deformed in axial and circumferential directions. Rigidity of the spring 20 in circumferential directions is considerably lower than that of the coil spring 11 in circumferential directions. First engagement portions 20b projecting outward in radial directions are formed in corners of the spring 20.

The first engagement portions 20b are of sector form. Engagement portions 20b are placed between the supporting portions 3b in the second plate 3B and mesh with sectional surfaces of opposite ends of the supporting portions 3b in circumferential directions. In an inner circumferential portion of the spring 20, second engagement portions 20c have projections protruding inward in radial directions and engagement portions extending from opposite sides of them in axial directions. The second engagement portions 20c come in contact with the inside of the notches 6c of the spline hub 6, as shown in FIG. 1. The projections of the second engagement portions 20c mesh with opposite sides of the outside spline teeth 6a of the spline hub 6. Hence, the spring 20 and the spline hub 6 cannot relatively rotate. When assembled, the spring 20 is compressed in axial directions, and therefore, the spring 20 in such a state as shown in FIG. 1 elastically urges the spline hub 6 to the left in FIG. 1 and the second disc elements 3 to the right in FIG. 1.

The third friction washer 21 is positioned close to an inner circumferential portion of the second disc element 3A and on the right in FIG. 1. In an inner circumferential portion of the third friction washer 21, spline grooves 21a are formed so as to mesh with the outside spline teeth 6a of the spline hub 6. The spline grooves 21a of the third friction washer 21 are provided with engagement portions 21b, and the engagement portions 21b come in contact with the engagement projections 6b of the spline hub 6 from the left side of FIG. 1. In this way, the third friction washer 21 is placed between the inner circumferential portion of the first plate 3A and the engagement projections 6b of the spline hub 6. The third friction washer 21 engaged with the spline hub 6 so as not to relatively rotate is urged to an inner circumferential surface of the first plate 3A.

An operation of the mechanism will be described below.

When the friction facings 24 of the torque input element 8 is pressed against a rotating flywheel (not shown), torque is transmitted to the torque input element 8 and then to the first disc element 2. The torque of the first disc element 2 is transmitted to the pair of the second disc elements 3 through the coil springs 11 and further to the hub flange 6 through the spring 20 and is output to the power input shaft of the transmission (not shown) from the hub flange 6.

Torque transmission from the first disc element 2 to the spring 2 through the coil springs 11 and the pair of the second disc elements 3 will now be described in detail. When the end surfaces in circumferential directions of the window holes 2b of the first disc element 2 push ends of the coil springs 11, the opposed ends of the coil springs 11 push the cut-away surfaces 3c of the pair of the disc elements 3. The torque is transmitted from the cut-away surfaces 3c through gaps between adjacent ones of the cut-away surfaces 3c and the supporting portions 3b. Eventually, the torque of the second disc elements 3 is transmitted to the spring 20.

Relative movement of the components in the clutch disc assembly 1 will be described, for example, in conjunction with a situation where torsional vibration is transmitted therein. If relatively small amounts of vibration are transmitted to the clutch disc assembly 1, there is a small torsional angle of displacement between relatively rotatable parts. For instance, the spring 20 is elastically deformed in circumferential directions between the second disc elements 3 and the spline hub 6; that is, the spline hub 6 and the second disc elements 3 experience limited relative rotary displacement. Simultaneously, the third friction washer 21, while rotating along with the spline hub 6 in unity, slides relative to the second disc elements 3 to generate a small level of friction resistance. Such properties of low rigidity and small frictional resistance effectively dampen the relatively small amounts of torsional vibration with a small torsional angle of displacement. Since the third friction washer 21 rotates along with the spine hub 6 in unity, the frictional resistance is stably generated.

If relatively large torsional vibrations are transmitted to the clutch disc assembly 1, then relatively rotatable parts undergo a large torsional angle of displacement. For instance, the first disc element 2 and the second disc elements 3 undergo relative rotary displacement. Specifically, when an angle of the torsional vibration is great, the spline hub 6 and the second disc elements 3 no longer relatively rotate, and the coil springs 11 are elastically deformed between the second disc elements 3 and the spline hub 6 mated with each other in unity. In this situation, the first friction washer 15 and the second friction washer 16 rotating along with the second disc elements 3 in unity slide on an inner circumferential side surface of the first disc element 2 to generate a high level of friction resistance. Such properties as high rigidity and large frictional resistance effectively dampen the torsional vibration of a large torsional angle. Since the first friction washer 15 and the second friction washer 16 rotate along with the second disc elements 3 in unity, the friction resistance is stably generated. In addition to that, since the cone spring 14 rotates along with the second disc elements 3 in unity, damage to the first friction washer 15 can be avoided.

Effects obtained by the components and combinations of the components will be described in detail below.

(a) Since torque applied to the cut-away surfaces 3c of the second disc elements 3 is transferred through the supporting portions 3b, the second disc elements experience limited damage, even with a small distance between adjacent ones of the cut-away surfaces 3c. Hence, in the clutch disc assembly 1, the possible displacement torsional angle between relatively rotatable parts is large while damage of the components during displacement is minimized.

(b) The second disc elements 3 have their spline teeth 3a extending in axial directions engaged with the spline hub 6 and the total contact area with the spline hub 6 is relatively large. Thus, engagement portions of the second disc elements are less likely to experience damage during periods of high torsional vibration or sudden shocks. Additionally, since no rivet is used, unlike the prior art, the dimension in radial direction of the engagement portions can be minimized. Since the spline teeth 3a may be formed by means of a pressing operation, processing and changing in shape are easily facilitated. Thus, the spline teeth 3a can be fabricated in such shapes that they prevent the spline teeth 3a from rotating relative to the outside spline teeth 6a of the spline hub 6 or that a specified distance can be retained in circumferential directions between adjacent ones of the spline teeth 3a. Since the spline teeth 3a of the first plate 3A and the spline teeth 3a of the second plate 3B extend so as to come close to each other, the physical dimensions in axial direction of the clutch disc assembly 1 can be minimized.

(c) Since the stopper pins 27 pass through the window holes 2b in the first disc plate 2, a wide range of the torsional angle on the first disc element 2 and the second disc elements 3 is retained. In addition to that, since the stopper pins 27 are placed in outer circumferences of the coil springs 11, the range of the torsional angle is further widened. Moreover, the stopper pins are components elongated in circumferential directions, a coil dieter of the coil springs 11 can be increased. This brings about a larger capacity of torque transmission by the coil springs 11. Two legs 27a are formed in each of the stopper pins 27, and therefore, a sufficient hardness can be attained even if they are more elongated in circular directions. Furthermore, since there are three holes 3f are formed in the step portions 3e in the first and second plate 3A and 3B of the second disc elements, the first plate 3A and the second plate 3B are generally similarly shaped and may be formed using the same process. Hence, a single kind of components may be fabricated, and this leads to simplification of a manufacturing process.

(d) Since the step portions 3e are formed in the second disc elements. 3, the coil dieter of the coils 11 can be larger. The reason for this may be explained as follows: The coil dieter of the coils 11 becomes larger, the supporting portions 3b expand outward in radial directions. Hence, positions where the stopper pins are to be fixed in the second disc elements 3 (flat portions) are displaced toward the outer circumference, and the stopper pins are accordingly moved to the outer circumference. For this reason, the window holes 2b in the first disc element 2 must be enlarged to the outer circumference, and this leads to a narrower width of the outer circumference outside the window holes and eventually to a degradation of hardness of the first disc element 2. In this embodiment, however, since the step portions 3e are provided, the flat portions where the stopper pins 27 are fixed can be located in the inner circumferential portion. As a result, there is little problem even if the coil diameter of the coil springs 11 is increased.

(e) Since the spring 20 works two ways as a small spring and a cone spring as in the prior art, the number of the components is reduced, and the configuration is simplified. The spring 20 is also made of a single plate, and therefore, the configuration is further simplified.

(f) The spring 20 and the third friction washer 21 are placed on opposite sides of the second disc elements 3A and 3B, and therefore, assembling and disassembling of them are easily facilitated.

(h) The spline teeth 3a of the second disc element 3 mesh with the outside spline teeth 6a of the spline hub 6 and function as engagement portions for the elements of the first frictional resistance generating mechanism 12. hence, there is no need of particularly providing portions engaging with the first frictional resistance generating mechanism 12, and the configuration of the second disc element 3 is simplified.

In a clutch disc assembly according to the present invention, since first spline teeth laterally protruding are formed in an inner circumferential portion of a second disc element, a contact area of the second disc element with a hub becomes larger, and the second disc element is not easily damaged.

If the first spline teeth are formed by means of a press, processing them is more easily facilitated.

If there are specified clearances in circumferential directions between the first spline teeth and second spline teeth, the second disc element and the hub can relatively rotate.

If the clutch disc assembly further includes a second elastic element and a first frictional resistance generating mechanism, the second elastic element is elastically deformed in circular directions and the first friction resistance generating mechanism generates frictional resistance when the second disc element and the hub relatively rotate. Consequently, torsional vibration is effectively dampened.

When the clutch disc assembly further includes a second frictional resistance generating mechanism and both a friction plate and an urging element mesh with outer circumferences of the first spring teeth, the urging element and the friction plate rotate stably in the second frictional resistance generating mechanism, and a stable property of generating the frictional resistance is attained. In this situation, the first spline teeth are portions engaging the second disc element with the hub and engaging with components of the second frictional resistance generating mechanism. Thus, there is no need of particularly providing portions engaging with the second frictional resistance generating mechanism, and the configuration of the second disc element is simplified.

In a clutch disc assembly according to the present invention, since a second elastic element in a second coupling mechanism functions as an urging element for urging a friction plate as well as an elastic element between a hub and second disc elements, the number of components can be decreased, compared with the prior art embodiment, the configuration is simplified.

In case where the second elastic element is made of a single plate where slits are formed, the configuration is simplified.

In case where a plurality of slits extending in circular directions are formed in the second elastic element, elastic deformation in circular directions is facilitated, and urging force in axial directions is sufficiently ensured.

In case where the friction plate engages with second one of the hub and the second disc elements so as not to rotate, the friction plate frictionally slides on the first one of them while rotating along with the first one in unity, and therefore, the friction resistance is stably generated.

In case where the second elastic element engages with the second one of the hub and the second disc elements so as not to rotate, the second elastic element rotates along with the friction plate in unity, the friction plate is not easily damaged.

In case where an inner circumferential portion of the friction plate engages with an outer circumferential portion of the hub, the friction plate frictionally slides on the second disc elements while rotating along With the hub in unity. In this case, since the friction plate rotates along with the hub in unity, the frictional resistance is stably generated.

In case where the second elastic element and the friction plate are disposed on opposite sides of the second disc elements, assembling and disassembling of them are facilitated.

In case where the second elastic element has the first engagement portion engaging with the supporting portions so as not to relatively rotate and the second engagement portion engaging with the spline teeth of the hub so as not to relatively rotate, the second elastic element adapts its shape to other components for engagement, and there is no need of providing any particular engagement portion.

In case where the first engagement portion urges the second disc elements to one of the components while the second engagement portion urges the hub to the other, the hub and the friction plate push against each other in axial directions. In this case, there is no need of providing the hub and the friction plate close to each other.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A vibration damper mechanism, comprising:
    a first disc member formed with a plurality of circumferentially spaced apart windows;
    a pair of second disc members disposed on opposite sides of said first disc member, said second disc members formed with first spline teeth axially extending from an inner circumferential portion thereof;
    first elastic members, each one of said first elastic members disposed within one of said windows and disposed between said second disc members, said first elastic members elastically deformable in response to relative rotary displacement between said first disc member and said second disc members;
    a hub formed with second spline teeth on its outer circumference, said second spline teeth engaging said first spline teeth; and
    a plurality of pins extending between said second disc members, one of each of said pins extending through a corresponding one of said windows, said pins confining said second disc members to rotate with one another.

2. The vibration damper mechanism as in claim 1 further comprising:
    a frictional resistance generating mechanism generating frictional resistance between said first disc member and said hub in response to relative rotary displacement between said first disc member and said hub; and
    a second elastic member disposed between a portion of said hub and said second disc members, said second elastic member being deformable in response to relative rotary displacement between said hub and said second disc members, deformation of said second elastic member urging said frictional resistance generating mechanism to generate frictional resistance.

3. The vibration damper mechanism according to claim 2, wherein a plurality of slits extending in circumferential directions are formed in said second elastic member.

4. The vibration damper mechanism according to claim 2, wherein said frictional resistance generating mechanism comprises a first friction plate disposed between first disc member and one of said second disc members, said first friction plate engaging said one of said second disc members to rotate therewith.

5. The vibration damper mechanism according to claim 4, wherein said frictional resistance generating mechanism further comprises a cone spring disposed between said first friction plate and said one of said second disc members.

6. The vibration damper mechanism according to claim 4, wherein said frictional resistance generating mechanism further comprises a second friction plate disposed between first disc member and a second of said second disc members, said second friction plate configured for engagement with said second of said second disc members for rotation therewith.

7. The vibration damper mechanism according to claim 6, wherein said frictional resistance generating mechanism further comprises a third friction plate disposed between said second of said second disc members and a portion of said hub, said third friction plate engaging said hub to rotate therewith.

8. The vibration damper mechanism according to claim 2, wherein said frictional resistance generating mechanism comprises a first friction plate disposed between said hub and one of said second disc members, said first friction plate engaging said hub to rotate therewith.

9. The vibration damper mechanism according to claim 2, wherein said second elastic member is connected to both said hub and one of said second disc members allowing limited rotary displacement between said hub and said one of said second disc members.

10. The vibration damper mechanism according to claim 2, wherein said second elastic member and said hub axially confine said second disc members and said first disc member.

11. A vibration damper mechanism, comprising:
    a first disc member formed with a plurality of circumferentially spaced apart windows;
    a pair of second disc members disposed on opposite sides of said first disc member, said second disc members formed with first spline teeth axially extending from an inner circumferential portion thereof;
    first elastic members, each one of said first elastic members disposed within one of said windows and disposed between said second disc members, said first elastic members elastically deformable in response to relative rotary displacement between said first disc member and said second disc members;

a hub formed with second spline teeth on its outer circumference, said second spline teeth engaging said first spline teeth; and wherein said first spline teeth on said second disc members are formed with an inner circumferential gear surface engaging said second gear teeth, and an outer circumferential gear surface.

12. The vibration damper mechanism according to claim 11, further comprising a friction disc formed with gear teeth engaging said outer circumferential gear surface.

13. The vibration damper mechanism as in claim 11 further comprising:

a frictional resistance generating mechanism generating frictional resistance between said first disc member and said hub in response to relative rotary displacement between said first disc member and said hub; and a second elastic member disposed between a portion of said hub and said second disc members, said second elastic member being deformable in response to relative rotary displacement between said hub and said second disc members, deformation of said second elastic member urging said frictional resistance generating mechanism to generate frictional resistance.

14. The vibration damper mechanism according to claim 13, wherein a plurality of slits extending in circumferential directions are formed in said second elastic member.

15. The vibration damper mechanism according to claim 13, wherein said frictional resistance generating mechanism comprises a first friction plate disposed between first disc member and one of said second disc members, said first friction plate engaging said one of said second disc members to rotate therewith.

16. The vibration damper mechanism according to claim 15, wherein said frictional resistance generating mechanism further comprises a cone spring disposed between said first friction plate and said one of said second disc members.

17. The vibration damper mechanism according to claim 15, wherein said frictional resistance generating mechanism further comprises a second friction plate disposed between first disc member and a second of said second disc members, said second friction plate configured for engagement with said second of said second disc members for rotation therewith.

18. The vibration damper mechanism according to claim 17, wherein said frictional resistance generating mechanism further comprises a third friction plate disposed between said second of said second disc members and a portion of said hub, said third friction plate engaging said hub to rotate therewith.

19. The vibration damper mechanism according to claim 13, wherein said frictional resistance generating mechanism comprises a first friction plate disposed between said hub and one of said second disc members, said first friction plate engaging said hub to rotate therewith.

20. The vibration damper mechanism according to claim 13, wherein said second elastic member is connected to both said hub and one of said second disc members allowing limited rotary displacement between said hub and said one of said second disc members.

21. The vibration damper mechanism according to claim 13, wherein said second elastic member and said hub axially confine said second disc members and said first disc member.

22. A vibration damper mechanism, comprising:

a first disc member formed with a plurality of circumferentially spaced apart windows;

a pair of second disc members disposed on opposite sides of said first disc member, said second disc members formed with first spline teeth axially extending from an inner circumferential portion thereof;

first elastic members, each one of said first elastic members disposed within one of said windows and disposed between said second disc members, said first elastic members elastically deformable in response to relative rotary displacement between said first disc member and said second disc members;

a hub formed with second spline teeth on its outer circumference, said second spline teeth engaging said first spline teeth, wherein a predetermined clearance is formed in circumferential directions between said first spline teeth and said second spline teeth such that there is limited relative rotary displacement therebetween; and a second elastic member elastically deformable in circumferential directions between said second disc members and said hub, said second elastic member being formed of a single plate-like member having a plurality of arcuate shaped slits formed therein.

23. The vibration damper mechanism according to claim 22 further comprising:

a first frictional resistance generating mechanism which generates frictional resistance between said second disc members and said hub in response to relative rotary displacement between said second disc members and said hub.

24. The vibration damper mechanism according to claim 23, further comprising:

a second frictional resistance generating mechanism for generating frictional resistance between said first disc member and said second disc members in response to relative rotary displacement between said first disc member and said second disc members, the second frictional resistance generating mechanism including a friction plate which meshes with said first spline teeth so as to rotate therewith and said friction plate contacts one of said second disc members, and an urging member which meshes with said first spline teeth for rotation therewith, said urging member urging said friction plate toward said second disc members.

25. The vibration damper mechanism according to claim 22, wherein the first spline teeth are formed by deformation of said second disc members.

26. A vibration damper mechanism, comprising:

a first disc member formed with a plurality of circumferentially spaced apart windows;

a pair of second disc members disposed on opposite sides of said first disc member, said second disc members formed with first spline teeth axially extending from an inner circumferential portion thereof;

first elastic members, each one of said first elastic members disposed within one of said windows and disposed between said second disc members, said first elastic members elastically deformable in response to relative rotary displacement between said first disc member and said second disc members;

a hub formed with second spline teeth on its outer circumference, said second spline teeth engaging said first spline teeth, wherein a predetermined clearance is formed in circumferential directions between said first spline teeth and said second spline teeth such that there is limited relative rotary displacement therebetween;

a second elastic member elastically deformable in circumferential directions between said second disc members and said hub;

a first frictional resistance generating mechanism which generates frictional resistance between said second disc members and said hub in response to relative rotary displacement between said second disc members and said hub; and a second frictional resistance generating mechanism for generating frictional resistance between said first disc member and said second disc members in response to relative rotary displacement between said first disc member and said second disc members, the second frictional resistance generating mechanism including a friction plate which meshes with said first spline teeth so as to rotate therewith and said friction plate contacts one of said second disc members, and an urging member which meshes with said first spline teeth for rotation therewith, said urging member urging said friction plate toward said second disc members.

27. The vibration damper mechanism according to claim 26, wherein the first spline teeth are formed by deformation of said second disc members.

28. The vibration damper mechanism according to claim 26, wherein said second elastic member is formed of a single plate-like member having a plurality of arcuate shaped slits formed therein.

29. A vibration damper mechanism, comprising:

a first disc member formed with a plurality of circumferentially spaced apart windows;

a pair of second disc members disposed on opposite sides of said first disc member, said second disc members formed with first spline teeth axially extending from an inner circumferential portion thereof;

first elastic members, each one of said first elastic members disposed within one of said windows and disposed between said second disc members, said first elastic members elastically deformable in response to relative rotary displacement between said first disc member and said second disc members;

a hub formed with second spline teeth on its outer circumference, said second spline teeth engaging said first spline teeth;

a frictional resistance generating mechanism generating frictional resistance between said first disc member and said hub in response to relative rotary displacement between said first disc member and said hub; and a second elastic member disposed between a portion of said hub and said second disc members, said second elastic member being deformable in response to relative rotary displacement between said hub and said second disc members, deformation of said second elastic member urging said frictional resistance generating mechanism to generate frictional resistance, wherein a plurality of slits extending in circumferential directions are formed in said second elastic member.

* * * * *